(No Model.) 5 Sheets—Sheet 1.

B. F. STEWART.
HARVESTER.

No. 525,817. Patented Sept. 11, 1894.

Witnesses
W. C. Coolies
Martin H. Olsen.

Inventor
Benjamin F. Stewart,
By Coburn & Thacher
Atty's (No Model.)　　　　　B. F. STEWART.　　　5 Sheets—Sheet 2.
HARVESTER.
No. 525,817.　　　　　　　Patented Sept. 11, 1894.
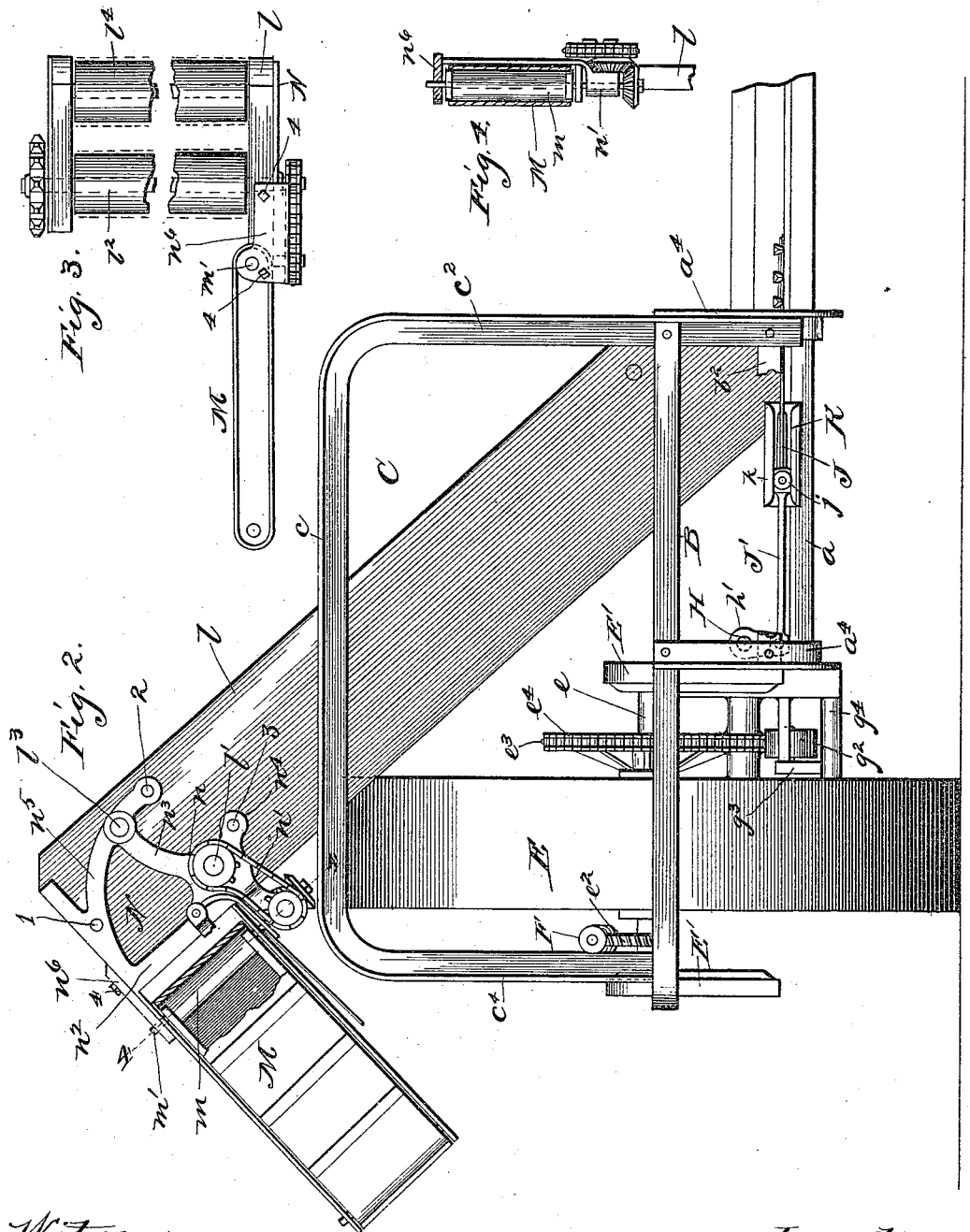
Witnesses
W. C. Coolies
Martin H. Olsen.
Inventor
Benjamin F. Stewart.
By Thacher
Att'ys (No Model.) 5 Sheets—Sheet 3.
B. F. STEWART.
HARVESTER.

No. 525,817. Patented Sept. 11, 1894.

Witnesses
W. C. Coolies
Martin H. Olsen.

Inventor
Benjamin F. Stewart.
By Coburn & Thacher
Atty's (No Model.) 5 Sheets—Sheet 4.
B. F. STEWART.
HARVESTER.
No. 525,817. Patented Sept. 11, 1894.
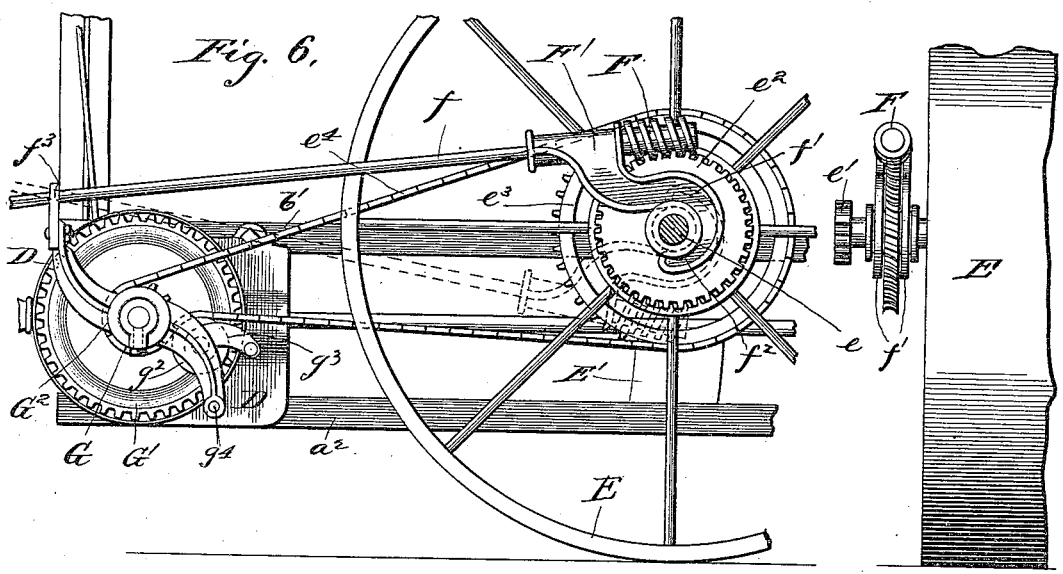
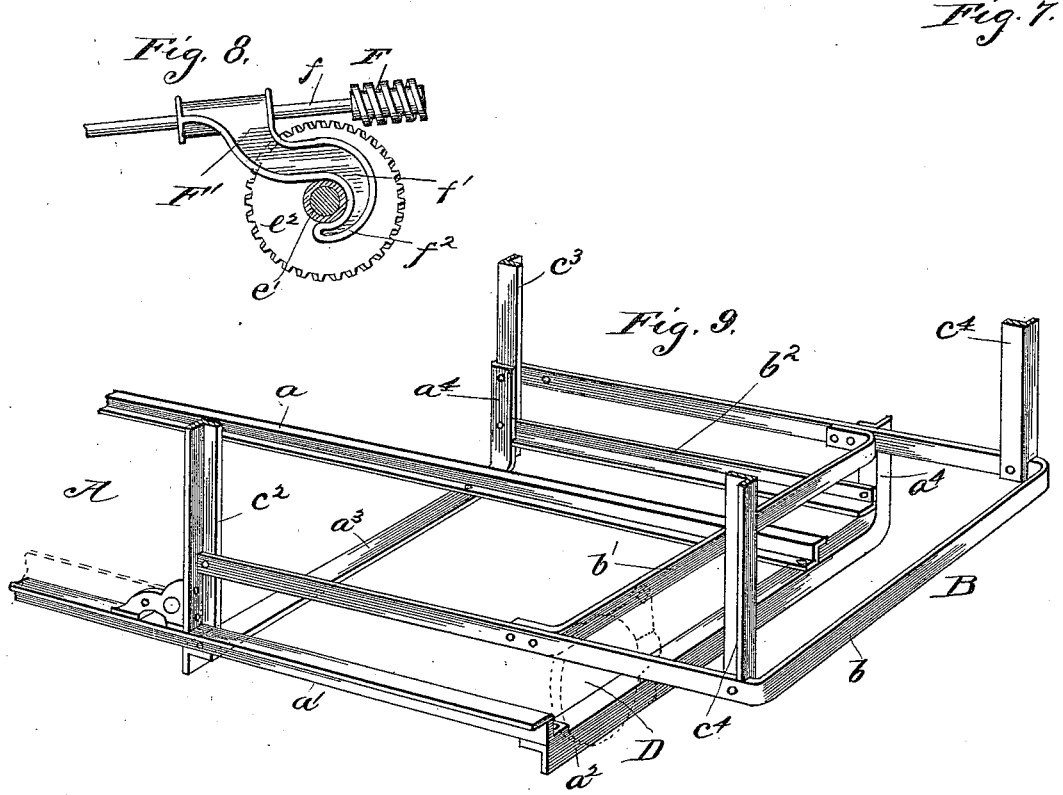
Witnesses
W. C. Corliss
Martin H. Olsen
Inventor
Benjamin F. Stewart
By Coburn & Thatcher
Attys (No Model.) 5 Sheets—Sheet 5.
B. F. STEWART.
HARVESTER.
No. 525,817. Patented Sept. 11, 1894.
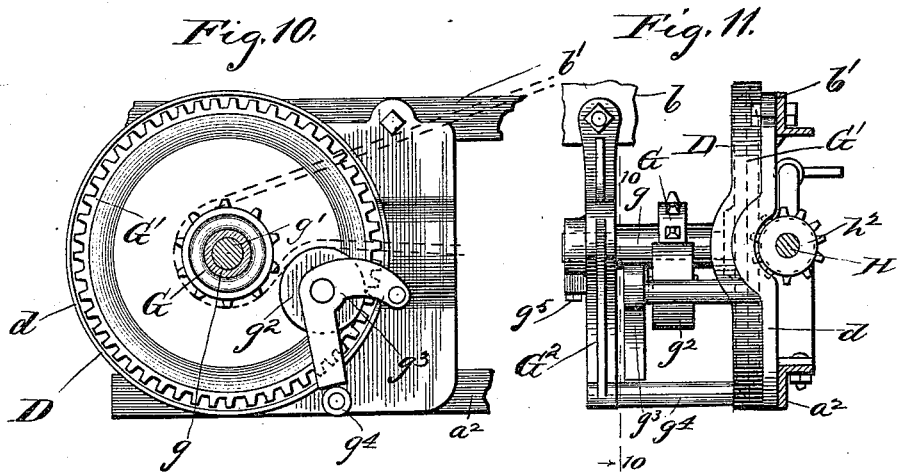
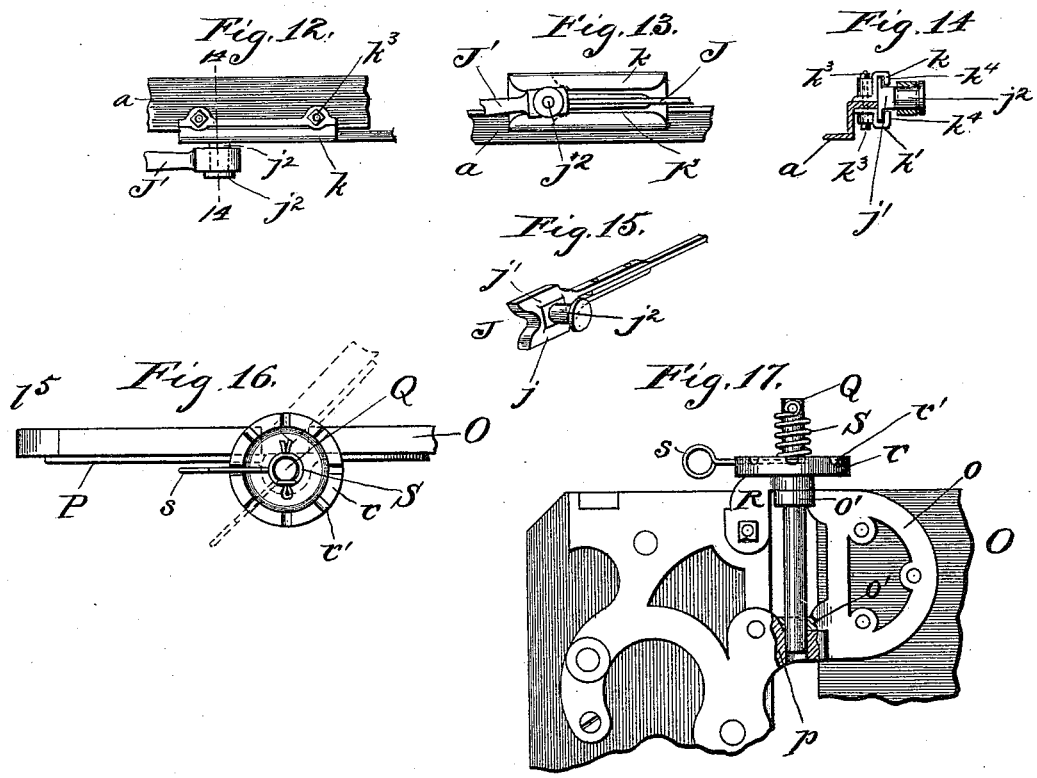
Witnesses
W. C. Coolis
Martin H. Olsen.
Inventor
Benjamin F. Stewart,
By Coburn & Thacher
Atty's

UNITED STATES PATENT OFFICE.

BENJAMIN F. STEWART, OF WEST PULLMAN, ILLINOIS.

HARVESTER.

SPECIFICATION forming part of Letters Patent No. 525,817, dated September 11, 1894.

Application filed July 13, 1891. Renewed April 6, 1894. Serial No. 506,638. (No model.)

*To all whom it may concern:*

Be it known that I, BENJAMIN F. STEWART, a citizen of the United States, now residing at West Pullman, in the county of Cook and State of Illinois, have invented certain new and useful Improvements in Harvesters, which are fully set forth in the following specification, reference being had to the accompanying drawings, in which—

Figure 1:
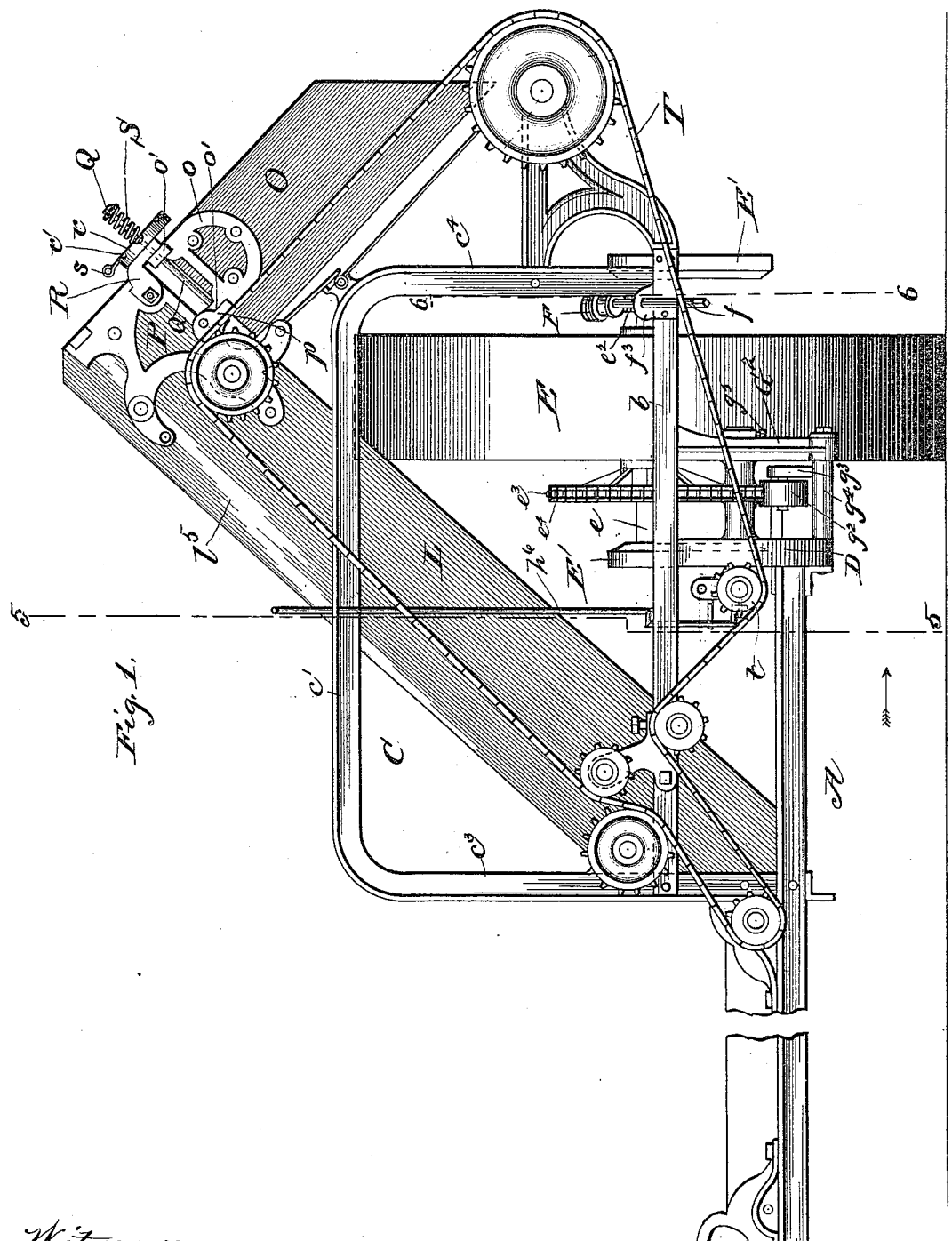
Figure 5:
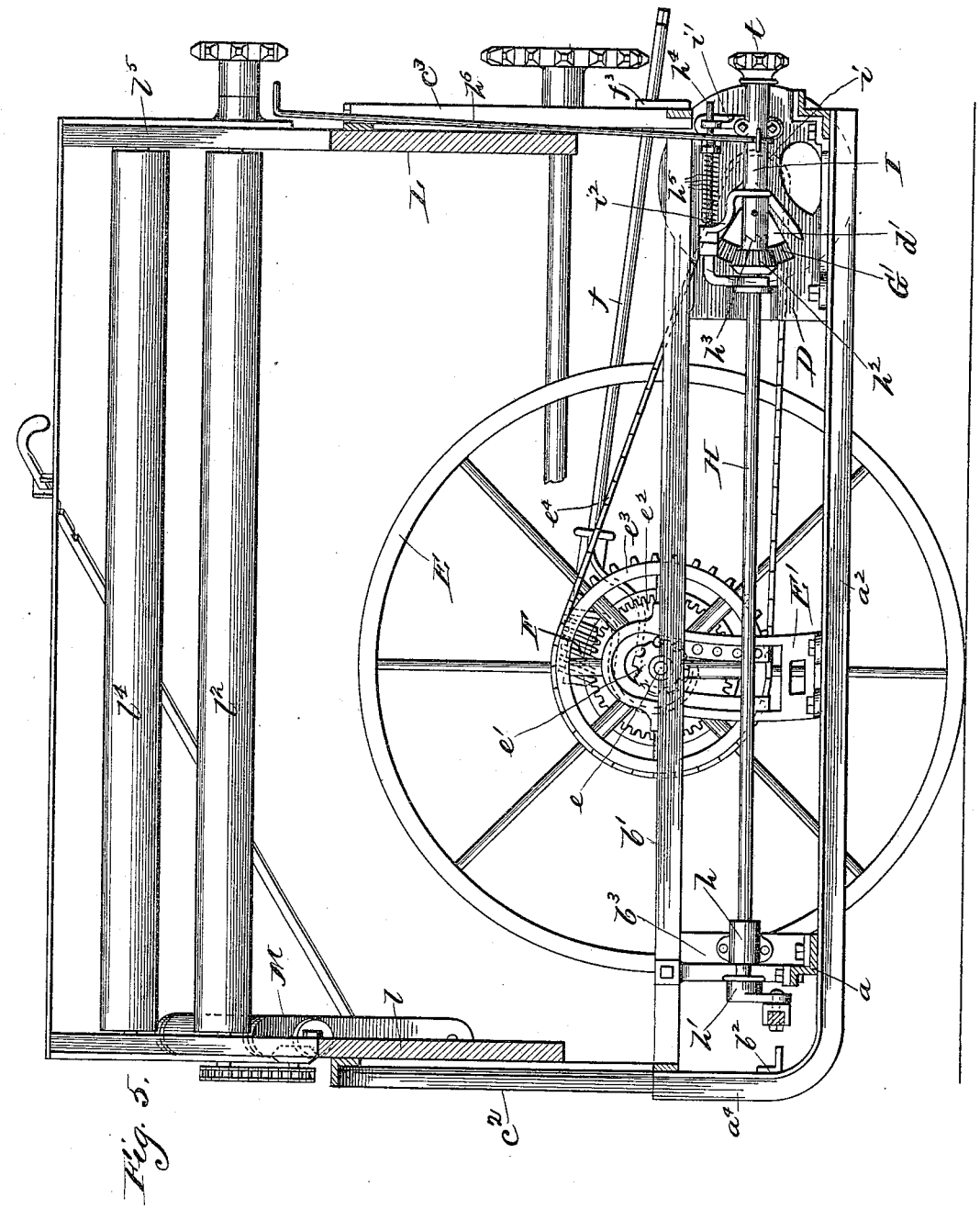

Figure 1 represents a rear elevation of a harvester embodying my invention, the central portion of the platform being broken away; Fig. 2, a front elevation of the same, the outer portion of the platform being broken away; Fig. 3, a plan view of the butt evener, detached; Fig. 4, a detail section of the same, taken on the line 4, 4, of Fig. 2; Fig. 5, a cross-section of the machine, taken on the line 5, 5, of Fig. 1 and looking toward the stubble; Fig. 6, a detail section, taken on the line 6, 6, of Fig. 1 looking inward; Fig. 7, a front elevation of the ground-wheel and raising and lowering mechanism, detached; Fig. 8, a detail side elevation of the raising and lowering device, detached; Fig. 9, a perspective view of the lower portion of the platform and gear frame in skeleton; Fig. 10, a detail section on the line 10, 10, of Fig. 11 of the rear portion of the driving gear shown in Fig. 6; Fig. 11, a rear elevation of the same; Fig. 12, a detail plan showing the pitman connection to the knife-bar; Fig. 13, a front elevation of the same; Fig. 14, a cross-section of the same, taken on the line 14, 14, of Fig. 12; Fig. 15, a perspective view of the knife-head, detached; Fig. 16, a detail plan of the hinged end of the end board on the incline; and Fig. 17, a rear elevation of the same. Figs. 1 to 9, inclusive, are on one and the same scale. Figs. 10 to 17, inclusive, are also upon one and the same scale, but considerably enlarged from the former.

My invention relates to machines for harvesting grain, in which the grain is cut and automatically bound upon the machine; but the improvements in the present case relate to the harvester proper and not to the grain binder.

The invention consists in improvements of several parts of the harvester, all of which will be hereinafter fully described and designated in connection with such description of the construction and operation of a complete harvester, in which I have embodied my invention in one practical form, as is necessary to understand the several improvements which I believe to be new and desire to secure by Letters Patent, which improvements will be pointed out more definitely in claims.

In general organization the machine is of ordinary type and those parts which are well-known and common to all harvesters will require no special description. The harvester is a metal-frame machine, in which usually the skeleton frame is composed almost entirely of steel bars. This general frame may be said to consist of three parts: the platform frame, A; the main gear frame, B; and the upright or elevator frame, C, all of which parts are firmly secured together, so as to make practically a single structure. Only certain parts of the platform frame need be mentioned. It has, as usual, side sills, $a$, $a'$, the former the front and the latter the rear sill and both extending nearly to the main wheel. These sills are joined together at the stubble side of the machine by a cross-sill, $a^2$, and at some distance inside the latter by another cross-sill, $a^3$, which is located considerably inside of the main wheel and about at the foot of the elevator. The forward ends of these cross-sills extend a little distance in front of the front sill $a$ and are then bent upward, so as to form short upright posts, $a^4$, standing a little distance in front of the front platform sill, as seen in Fig. 9. The gear-frame B consists of a single bar, $b$, bent to form three sides of a rectangle and arranged horizontally with its free ends inward. The front side of this bar is fastened, respectively, to the upper ends of the upright portions $a^4$ of the cross-sills $a^2 a^3$. The rear side of this bar is fastened at its free end to the inside post of the rear section, $c$, of the upright or elevator frame. A cross-bar, $b'$, runs from front to rear of this bar, just over the cross-sill, $a^2$, of the platform frame. At its front end it is secured to both the front of the bar $b$ and also the upright $a^4$. At its rear end it is fastened to the rear portion of the bar $b$ and also to a gear block, D, arranged between the said bar and the cross-sill below, thus forming a support for the rear end of the cross-bar, $b'$ and so also for the rear section of the bar $b$. A brace bar, $b^2$, extends across from one upright $a^4$ to the other at the front of the frame, being raised a little from the level of the platform frame and secured to each of the said uprights. The bent bar $b$ extends out considerably beyond the platform frame on the stubble side, as seen in Figs. 1 and 9. The upright or elevator frame C is composed of front and rear sections $c, c'$, which are bent, as seen in Figs. 1 and 2.

The inner upright portion or post, $c^2$, of the front section $c$ extends down to the platform frame and is there fastened; but the similar part, $c^3$, of the rear section extends down near to the cross brace $b^2$ and is there secured to the upright $a^4$, as seen in Fig. 9. The two outer posts, $c^4$, of the front and rear sections, extend down only to the horizontal bar $b$ on which they rest and to which they are fastened, as also seen in Fig. 9. The main or gear wheel, E, is arranged at the stubble end of the platform frame and in the space between the cross-bar $b'$ and the outer end of the bar $b$. This wheel is loose on its axle, $e$, as usual, and the axle is provided with pinions, $e'$, which run in the gear sectors, E', for raising and lowering the frame on the wheel axle in the well-known way, these sectors being suitably fastened to the steel frame of the machine.

I will now describe the lifting mechanism for raising and lowering the machine. A worm gear wheel, $e^2$, is fixed on the main axle, just outside of the main wheel. A worm, F, on the front end of a long shaft, $f$, is mounted, so as to engage with this worm gear wheel. The front end of this shaft is mounted in a bracket, F', of peculiar construction. The body or center of the bracket is tubular to provide a bearing for the shaft and from this body there depend two arms, $f'$, slightly separated from, but parallel with each other, thus forming a kind of fork; and the extremities of these arms are bent to form a kind of hook, $f^2$. These bends are adapted to hook around the main axle, as seen in Figs. 6 and 8, thus providing for the attachment of the bracket to the axle and supporting it thereon, the arms of the bracket, in this position, embracing the worm gear, as seen in Fig. 7. The worm shaft extends back to the rear of the machine, where it is supported in a small bracket, $f^3$, and its rear end is constructed for the application of a crank, by means of which it may be turned. Obviously the rotation of this shaft will rotate the main axle by means of the worm gearing and so adjust the frame up and down on the main axle by means of the pinions and gear sectors in a well-known way. It will be seen that the bracket F' is loosely connected to the axle and obviously is readily detachable therefrom. This is accomplished by turning the worm out of the gear, while the wheel is held motionless, as seen in Fig. 8, when it is evident that the bracket may be unhooked from the axle and then the whole device may be removed from the machine by simply unscrewing the bolt that fastens the rear bracket to the frame, or pulling the shaft forward out of this rear support. The position of the bracket and shaft may be readily reversed, so that the shaft will be below the axle, instead of above, as seen in dotted lines in Fig. 6. This is sometimes desirable, especially in loading the machine for transportation when, the main wheel being stationary, the bracket may be applied as seen in the said dotted lines and the frame readily run up or down, as may be desired. A chain wheel, $e^3$, is mounted on the axle $e$ on the inside of the main wheel and connected to the latter, so as to turn therewith: and to this wheel is applied a chain, $e^4$, which also runs over a chain pinion, G, fixed on a shaft, $g$, which is sleeved on a shaft, $g'$, the latter being passed through a pendent arm, $G^2$, on the bar $b$ and into a proper seat in the block D and secured by means of set-screws in each seat, one of which, $g^5$, on the pendant, is shown in Figs. 6 and 11. By loosening these screws this shaft can be taken out and the sleeve shaft with its attachments removed. A large bevel-gear, G', is also fastened to the shaft $g$ outside of the pinion G and next to the block D, which is provided with a projecting flange, $d$, on its inside face, within which this wheel is arranged. The block D is also cut away near its forward end, so as to provide an opening, $d'$, to the bevel-gear at this point. The crank-shaft, H, is arranged along the outside of the block D, being mounted at its front end in a bracket bearing, $h$, which is detachably fastened to an upright post, $b^3$, of the frame; while at its rear end it is mounted in a sleeve bracket, I, which is also detachably fastened by bolts to the outer face of the block D, as seen in Fig. 5. This bracket I is provided with a long sleeve portion, $i$, through which the shaft runs, from which rises, near its rear end, a short post, $i'$, and near its front end a similar post, $i^2$, which, however, is bent forward. The shaft itself is provided at its front end with the usual crank, or crank-wheel, $h'$, which drives the cutter, and with a common loose bevel gear pinion, $h^2$, which is adapted to engage with the bevel gear G', through the opening in the block D, heretofore mentioned, and is clutched to the shaft, when in engagement therewith, by an ordinary clutch device, $h^3$.

The pinion is slid upon the shaft to engage or disengage with the bevel wheel and clutch by means of an arm, $h^4$, mounted in the two posts of the sleeve I, adapted to slide back and forth therein, and bent down, at its forward end, to engage with the collar of the pinion in usual manner. A spring, $h^5$, is wound around the sliding arm, $h^4$ which operates to hold the pinion in gear normally, and a shipping lever, $h^6$, is provided for operating this arm to throw the pinion out of gear whenever desired, this lever being mounted on the sleeve bracket I. It will be seen from this description that, by simply removing the bolts which fasten the sleeve bracket I to the block D, the rear end of the crank shaft and all of its attachments are at once detached from the frame of the machine, and in like manner by removing the fastening bolts of the forward bracket $h$, this shaft may be entirely detached from the machine, a provision very desirable for purposes of repair. A tightening pulley, $g^2$, is provided for the drive chain $e^4$. It is mounted in a bent arm, $g^3$, which is pivoted to the inner face of the block D close to the inclosing rim of the bevel gear, as seen in Fig. 10, and the arm is of such length as to bring the pulley close up to the chain pinion G, so that there is only just about room for the chain to pass between the two, as seen in the said Fig. 10.

The outer portion of the pivoted arm is bent downward and rests upon a bar, $g^4$, between the gear block and arm $G^2$, so as to prevent the dropping of the pulley support, and the arrangement of the parts is such that the pulley extends up somewhat in front of the chain pinion, as seen in Fig. 10, and so after the chain is applied and the tightener mounted in position, it will always and positively compel the chain to engage with the pinion because of the slight space between the two, as will be seen from the arrangement shown in the said Fig. 10.

The knife bar, J, is of ordinary construction and is provided with a head, $j$, to which one end of the pitman, J', is connected, the other end being connected to the crank $h'$, as usual. The guide within which this knife-head slides and by which it is held to the frame is, however, of peculiar construction and mounting. This guide, K, is fastened to the front sill $a$, of the platform frame. This sill and also the rear sill $a'$ are Z-bars of angle iron and the guide is fastened to the upper flange of the bar, as seen in Figs. 13 and 14. For convenience of attachment the guide is made in two parts $k$, $k'$, each of which is provided with flat lugs adapted to seat the two pieces respectively upon the upper and lower face of the bar flange, in which position they are fastened to the bar by bolts $k^3$, passing through the lugs and the bar. Each of these pieces has a double right angled bend at its edge so as to form a lip, $k^4$, within which the knife-head is received, held and guided, being provided with flanges, $j'$, which are received within the lip guides for this purpose, as seen in Figs. 13 and 14. The knife-head is free to slide back and forth within this guide, the pitman-pin, $j^2$, moving freely in the open space between the two lips. This provides a very simple, but at the same time efficient means for securing the knife-head in place and guiding it in its reciprocation. At the same time it is readily detached from the bar, to which it is fastened, for repairs, or any other purpose necessary. This construction also dispenses entirely with the shoe which is ordinarily used in these machines, the guide, as already stated, being fastened directly to the front sill of the platform. The crank shaft H is so low down at its front end that the crank is brought nearly on a line with this guide for the knife-head, as seen in Fig. 2, so that the thrust of the pitman is nearly in a direct line with the reciprocation of the knife-bar, thus relieving the friction occasioned by the arrangement of the crank some distance above the plane of the knife-bar. The elevator, L, is of any ordinary construction, set at an incline to elevate the grain over the main wheel and supported by the platform frame and upright frame C, as usual.

The butt adjuster, M, is secured to the upper end of the front side bar, $l$, of the elevator, as seen in Fig. 2. The butt adjuster itself is of the endless apron type and its particular construction and also that of its driving devices need not be described; but the device for attaching the adjuster to the elevator and the particular arrangement of the former in relation to the elevating aprons are, I believe, novel. The adjuster is attached to the elevator by means of a bracket, N, which is of skeleton construction, as seen in Fig. 2. This skeleton may be said to have a central body, $n$, through which the extended shaft, $l'$, of the upper roller, $l^2$, of the under elevator apron is passed for the purpose of driving the apron or belt of the adjuster. This forms the central point for the attachment of the bracket to the elevator, as seen in the said Fig. 2. From this central portion what may be called arms radiate in different directions. One, $n'$, projects out beyond the lower edge of the side bar $l$ at about right angles thereto. Another, $n^2$, extends up along the same edge. A third, $n^3$, extends out radially toward the upper edge of the side bar $l$, and a fourth short arm, $n^4$, extends slightly downward and inward from the center. The arms $n^2$ and $n^3$ are also connected by a curved arm or brace, $n^5$, which is extended slightly beyond its junction with the arm $n^3$. At the upper end of this bracket there is also a wide flange, $n^6$, which extends inward at right angles to the main portion of the bracket over the upper end of the side bar $l$ and also down somewhat below the lower edge of the latter, as seen in Figs. 2 and 3.

The bracket is fastened to the side bar $l$ in the following way: In addition to the shaft $l'$, the shaft, $l^3$, of the head roller, $l^4$, of the upper elevator apron also passes through this bracket at the junction between the arm $n^3$ and brace bar, $n^5$. Then the bracket is further secured by screw bolts 1—2—3 passing, respectively, through the arm $n^4$, the extremity of the brace $n^5$ and the junction of the latter with the horizontal flange near the extreme upper end of the side bar $l$. Similar bolts 4 also pass through the said flange into the upper end of the said bar, as seen in Fig. 3. The inner roller, $m$, of the butt adjuster is mounted by giving its shaft, $m'$, bearings, respectively, in the bracket arm $n'$ and the projecting flange $n^6$, as seen in Figs. 2 and 4, and the arrangement of these parts is such that the shaft of this roller will be carried in so as to stand about on a line with the inner face of the side bar $l$, as seen in Fig. 3, and, as seen in the same figure, this will carry the apron or belt of the butt adjuster at its upper end in slightly beyond the front edge of the elevator aprons. As heretofore constructed, so far as I know, the mounting of the butt adjuster has been such that it stands at the outer edge of the side bar $l$ and this arrangement leaves a corner between the upper end of the adjuster and the upper end of the elevator aprons, within which the butts will be received, and as they are not caught at once by the adjuster, there will be some hesitation in the movement of the butts and a consequent tendency to clogging or tangling.

In my construction and arrangement described above there is no possibility of this result, for as the belt of the butt adjuster is a little inside the front edge of the elevator aprons, the butts will drop at once into contact with the adjuster and come immediately under its influence.

Very considerable difficulty has been experienced heretofore in the breakage of the bracket support for the adjuster, owing to shrinkage of the elevator inclined frame. With the construction of this bracket described above and the peculiar means of fastening by bolts at the several points mentioned, I have entirely obviated this difficulty.

The tail board, O, is attached, as usual, to the upper end of the rear side bar, $l^5$, of the elevator. It is mounted on this bar by means of a bracket, P, fastened to the side bar and a suitable bracket, $o$, on the tail board. This latter bracket is provided with lugs, $o'$, through which the pivot pin, Q, passes and in which it is made fast by shrinkage. The bracket P is also provided with a lug, $p$, near its lower end which is adapted to receive the lower end of the pivot pin. The upper bearing of this pin is, however, pivoted in a small supplementary lug-bracket, R, which is bolted to the bracket P, as seen in Fig. 17, and, of course, is readily detachable therefrom. This supplementary bracket is also provided at its upper end with a fixed disk, $r$, having notches, $r'$, in its upper face. A spring, S, is fastened at one end to the upper end of the pivot pin, coiled around the latter and then bent outward at right angles to the pin, thereby providing a short arm, $s$, which is adapted to engage with any one of the notches in the disk $r$. It will be seen then that the tail board may be adjusted at any angle desired by moving this bent arm of the spring from one notch to some other in the disk, as seen in Fig. 16, and it will also be seen that the device provides an elastic fastening for securing the board in any adjustment, so that it yields readily as may be required in changing conditions of the grain, the spring, of course, being comparatively light for this purpose.

The lug-bracket R is made independent and detachable to provide for the mounting of the parts, as described, as it will be seen that with the fixed pivot pin this could not be readily accomplished without a detachable bearing somewhere. The bracket P is in construction and means of fastening to the side bar quite similar to the supporting bracket of the butt adjuster, as will be seen on comparing the brackets shown, respectively, in Figs. 1 and 2.

As shown in the drawings, there is provided the usual driving mechanism for the elevator belts and binder, consisting of a chain, T, running over suitable sprocket-wheels and pinions and driven by a chain pinion, $t$, on the rear end of the shaft H. This is ordinary mechanism, however, and requires no description here, as it does not constitute any part of my present improvements.

Having thus described my invention, what I claim as new, and desire to secure by Letters Patent, is—

1. In a harvester, a gear frame B consisting of the single bar $b$, bent as specified, and the cross bar $b'$, in combination with the cross sills, $a^2$ $a^3$, bent upward at their forward ends to form uprights, $a^4$, and the posts, $c^2$ $c^3$ substantially as described.

2. In a harvester, the platform sills $a, a'$, in combination with the cross-sills $a^2$, $a^3$, extended in front of the platform sills and bent upward, as specified, the gear frame $b$, $b'$, the gear block D and the post $c^2$ of the rear upright section $c$, substantially as described.

3. In a harvester, a main frame adjustable vertically on the main wheel axle, in combination with a worm wheel $e^2$ fixed on said axle, a worm F to engage therewith and the bracket F' having the arms $f'$ adapted to embrace the said worm wheel and provided with hooks $f^2$ adapted to hook loosely around the axle, but readily detachable therefrom, substantially as described.

4. In mechanism for adjusting the main frame of a harvester vertically on the main axle, the worm wheel $e^2$ fixed on the axle, in combination with the worm F and a detachable bracket F' in which the worm is mounted provided with curved open hooks, $f^2$, whereby it is adapted to be loosely connected to the axle on either the upper or lower side thereof, substantially as described.

5. The gear block D mounted between the cross-bars of the platform and gear frames, in combination with the bevel gear G', chain driving pinion G on the same shaft, crank shaft H mounted on the block on the opposite side to the said bevel gear G', and the sliding pinion $h^2$ on said shaft adapted to engage with the said bevel gear through an opening in the block, substantially as described.

6. The gear block D, in combination with the crank shaft H and a supporting bracket I in which said shaft is mounted, attached to one side of said block and detachable bodily therefrom, substantially as described.

7. The gear block D, in combination with the crank shaft H, the sleeve bracket I fastened to the side of said block by removable bolts and the bracket $h$ detachably fastened to a suitable support at the front of the machine, whereby the said crank shaft and its supporting brackets may be readily detached and bodily removed from the machine, substantially as described.

8. The driving chain $e^4$, in combination with the chain pinion G the swinging support $g^3$ tightening pulley $g^2$ mounted in said support and arranged with only about sufficient space for the chain between it and the said pinion, and mechanism for driving said chain in a direction tending to pull the swinging support toward the pinion, G substantially as described.

9. The drive chain, in combination with the chain pinion G, the angular pivoted support $g^3$, tightening pulley $g^2$ mounted thereon mechanism for driving said chain in a direction tending to swing the said pivoted support toward the pinion G and the stop $g^4$ arranged and operating, substantially as described.

10. The front platform sill $a$, in combination with the guide K, composed of the two sections $k, k'$, fastened directly to the web of the said sill, and the knife bar J provided with a head $j$ adapted to reciprocate within the said guide, substantially as described.

BENJAMIN F. STEWART.

Witnesses:
CARRIE FEIGEL,
A. M. BEST.